(12) United States Patent
Ai et al.

(10) Patent No.: US 12,243,013 B2
(45) Date of Patent: Mar. 4, 2025

(54) REPLENISHMENT METHOD AND APPARATUS, COMPUTER DEVICE, AND STORAGE MEDIUM

(71) Applicant: HAI ROBOTICS CO., LTD., Guangdong (CN)

(72) Inventors: Xin Ai, Guangdong (CN); Runfang Yu, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 215 days.

(21) Appl. No.: 17/804,365

(22) Filed: May 27, 2022

(65) Prior Publication Data
US 2022/0284393 A1      Sep. 8, 2022

Related U.S. Application Data

(63) Continuation of application No. PCT/CN2020/130120, filed on Nov. 19, 2020.

(30) Foreign Application Priority Data

Dec. 10, 2019   (CN) .......................... 201911255070.0

(51) Int. Cl.
*G06Q 10/0875* (2023.01)
(52) U.S. Cl.
CPC ................................ *G06Q 10/0875* (2013.01)
(58) Field of Classification Search
CPC .................................................. G06Q 10/0875
See application file for complete search history.

(56) References Cited

U.S. PATENT DOCUMENTS

| 11,475,531 B2 * | 10/2022 | Ganesan | ............... G06Q 10/087 |
| 2015/0073589 A1 * | 3/2015 | Khodl | ....................... B25J 5/007 |
| | | | 700/218 |

FOREIGN PATENT DOCUMENTS

| CN | 103942670 A | 7/2014 |
|----|-------------|--------|
| CN | 104392341 A | 3/2015 |
| CN | 104504552 A | 4/2015 |
| CN | 105637544 A | 6/2016 |
| CN | 106966100 A | 7/2017 |
| CN | 107480922 A | 12/2017 |
| CN | 110062740 A | 7/2019 |
| CN | 110369295 A | 10/2019 |

(Continued)

OTHER PUBLICATIONS

International Search Report mailed Feb. 19, 2021; PCT/CN2020/130120.

*Primary Examiner* — Paul Danneman
(74) *Attorney, Agent, or Firm* — Frank Gao, Esq.

(57) ABSTRACT

This application relates to a replenishment method and apparatus, a computer device, and a storage medium. The method includes: obtaining a replenishment order, and determining a mapping relationship between goods information of replenishment goods in the replenishment order and a storage space of a put wall, where the mapping relationship is used for instructing to correspondingly place target replenishment goods into a target storage space of the put wall; and determining a target inventory box corresponding to the target replenishment goods placed in the target storage space of the put wall, where the target inventory box is used for loading the target replenishment goods. The use of the method improves the replenishment efficiency.

15 Claims, 7 Drawing Sheets

(56) References Cited

FOREIGN PATENT DOCUMENTS

| | | |
|---|---|---|
| JP | H0248302 A | 2/1990 |
| JP | H1159828 A | 3/1999 |
| JP | 2018188235 A | 11/2018 |
| WO | WO2018068026 A1 | 4/2018 |

* cited by examiner

REPLENISHMENT METHOD AND APPARATUS, COMPUTER DEVICE, AND STORAGE MEDIUM

CROSS-REFERENCE TO RELATED APPLICATIONS

This application claims priority to Chinese Patent Application No. 201911255070.0, entitled "REPLENISHMENT METHOD AND APPARATUS, COMPUTER DEVICE, AND STORAGE MEDIUM" filed with the China National Intellectual Property Administration on Dec. 10, 2019, which is incorporated by reference in its entirety.

TECHNICAL FIELD

This application relates to the technical field of logistics and warehousing, and in particular, to a replenishment method and apparatus, a computer device, and a storage medium.

BACKGROUND

With the rapid development of e-commerce, e-commerce has played an increasingly important role in the lives of consumers, and the number of online shopping orders grows exponentially every year, resulting in a large number of items stored in warehouses and a wide variety of these items. Thus, once replenishment is required, operators need to spend a lot of time counting and searching, resulting in low replenishment efficiency.

SUMMARY

In view of the above, to resolve the foregoing technical problems, it is desirable to provide a replenishment method and apparatus, a computer device, and a storage medium that can improve replenishment efficiency.

This application provides a replenishment method, including:

obtaining a replenishment order, and determining a mapping relationship between goods information of replenishment goods in the replenishment order and a storage space of a put wall, where the mapping relationship is used for instructing to correspondingly place target replenishment goods into a target storage space of the put wall; and determining a target inventory box corresponding to the target replenishment goods placed into the target storage space of the put wall, where the target inventory box is used for loading the target replenishment goods.

Optionally, determining the target inventory box corresponding to the target replenishment goods placed in the target storage space of the put wall includes:

receiving an entered box type, and determining the target inventory box according to the entered box type; or obtaining an inventory box type corresponding to goods information of the target storage space, and determining the target inventory box according to the inventory box type; or obtaining box types with a full box record corresponding to goods information of the target storage space, and determining the target inventory box according to the box types with the full box record; or obtaining an inventory box with an empty compartment, and determining the target inventory box according to the inventory box with an empty compartment; or obtaining a default box type, and determining the target inventory box according to the default box type.

Optionally, determining the target inventory box according to the box types with the full box record includes:

obtaining a box type with inventory among the box types with the full box record; and determining the target inventory box according to the box type with inventory among the box types with the full box record.

Optionally, the method further includes:

determining whether the box type with inventory among the box types with the full box record is capable of accommodating the target replenishment goods in the target storage space; and performing, if yes, the step of determining the target inventory box according to the box type with inventory among the box types with the full box record.

Optionally, determining whether the box type with inventory among the box types with the full box record is capable of accommodating the target replenishment goods in the target storage space includes:

obtaining a total loading quantity corresponding to the box type with inventory among the box types with the full box record;

obtaining a loaded quantity of the box type with inventory among the box types with the full box record;

determining, according to the total loading quantity and the loaded quantity, whether the box type with inventory among the box types with the full box record is capable of accommodating the target replenishment goods in the target storage space; and determining, when a quantity of the target replenishment goods in the target storage space is less than or equal to a difference between the total loading quantity and the loaded quantity, that the box type with inventory among the box types with the full box record is capable of accommodating the target replenishment goods in the target storage space.

Optionally, a method for generating the total loading quantity corresponding to the box type with the full box record includes:

recording a loaded quantity of the target inventory box as the total loading quantity corresponding to the box type with the full box record if a loading completion instruction of the target inventory box is received and the target replenishment goods exist in the target storage space when loading the target replenishment goods in the target storage space into the target inventory box; or recording a loaded quantity of the target inventory box as the total loading quantity corresponding to the box type with the full box record if a full box instruction for the target inventory box is received when loading the target replenishment goods in the target storage space into the target inventory box.

Optionally, the method further includes:

obtaining total loading quantities corresponding to a box type with the full box record with the same goods information for preset times; and determining the total loading quantity of the box type with the full box record according to the total loading quantities corresponding to the box type in the full box record with the same goods information for the preset times.

Optionally, the method further includes:

obtaining an empty box of a box type with the full box record if there is no box type with inventory among the box types with the full box record or the box type with inventory among the box types with the full box record is incapable of accommodating the target replenishment goods in the target storage space; and determining the target inventory box according to the empty box of the box type with the full box record.

Optionally, the method further includes:

determining whether the empty box of the box type with the full box record is capable of accommodating the target replenishment goods in the target storage space; and performing, if yes, the step of determining the target inventory box according to the empty box of the box type with the full box record.

Optionally, the method further includes:

changing the box type with the empty box of the box type in the full box record is incapable of accommodating the target replenishment goods in the target storage space; and determining the target inventory box according to the changed box type.

Optionally, the method further includes:

determining the target inventory box according to the empty box of the box type in the full box record if the empty box of the box type with the full box record is incapable of accommodating the target replenishment goods in the target storage space.

Optionally, the method further includes:

sending a restocking instruction when it is detected that all the target replenishment goods with the goods information corresponding to the target storage space are not placed into the target storage space, where the restocking instruction is used for instructing to replenish the target replenishment goods with the goods information corresponding to the target storage space in the target storage space.

Optionally, the method further includes:

sending a storage instruction when it is detected that a quantity of target inventory boxes loaded with the target replenishment goods reaches a preset threshold, where the storage instruction is used for instructing to put the target inventory boxes at corresponding positions of a warehouse.

Optionally, after determining a target inventory box corresponding to the target replenishment goods placed in the target storage space of the put wall, the method further includes:

changing the inventory box when the target inventory box is unloaded, where the changed inventory box is used for loading target replenishment goods corresponding to the unloaded target inventory box.

Optionally, the method further includes:

sending a box taking instruction after the target inventory box corresponding to the target replenishment goods placed in the target storage space is determined, where the box taking instruction is used for instructing to transport the target inventory box to a workstation.

This application further provides a replenishment apparatus, including:

an obtaining module, configured to: obtain a replenishment order, and determine a mapping relationship between goods information of replenishment goods in the replenishment order and a storage space of a put wall, where the mapping relationship is used for instructing to correspondingly place target replenishment goods into a target storage space of the put wall; and a determining module, configured to determine a target inventory box corresponding to the target replenishment goods placed into the target storage space of the put wall, where the target inventory box is used for loading the target replenishment goods.

This application further provides a computer device, including a memory and a processor. The memory stores a computer program. The processor, when executing the computer program, implements the following steps:

obtaining a replenishment order, and determining a mapping relationship between goods information of replenishment goods in the replenishment order and a storage space of a put wall, where the mapping relationship is used for instructing to correspondingly place target replenishment goods into a target storage space of the put wall; and determining a target inventory box corresponding to the target replenishment goods placed into the target storage space of the put wall, where the target inventory box is used for loading the target replenishment goods.

This application further provides a computer-readable storage medium, storing a computer program. When the computer program is executed by a processor, the following steps are implemented:

obtaining a replenishment order, and determining a mapping relationship between goods information of replenishment goods in the replenishment order and a storage space of a put wall, where the mapping relationship is used for instructing to correspondingly place target replenishment goods into a target storage space of the put wall; and determining a target inventory box corresponding to the target replenishment goods placed into the target storage space of the put wall, where the target inventory box is used for loading the target replenishment goods.

According to the replenishment method and apparatus, the computer device, and the storage medium, a replenishment order is obtained, and a mapping relationship between goods information of replenishment goods in the replenishment order and storage spaces of a put wall is determined, where the mapping relationship is used to indicate in which target storage space of the put wall target replenishment goods should be placed. A target inventory box corresponding to the target replenishment goods in the target storage space is determined, where the target inventory box is used to load the target replenishment goods. The sorting efficiency of replenishment goods is improved by the mapping relationship between the goods information and the storage spaces of the put wall. The loading efficiency of replenishment goods is improved by intelligently allocating inventory boxes. In this way, the replenishment efficiency is improved, and labor costs are reduced.

DETAILED DESCRIPTION

To make objectives, technical solutions, and advantages of this application clearer and more comprehensible, this application is further described in detail with reference to the accompanying drawings and embodiments. It should be understood that the specific embodiments described herein are only used for explaining this application, and are not intended to limit this application.

Figure 1:
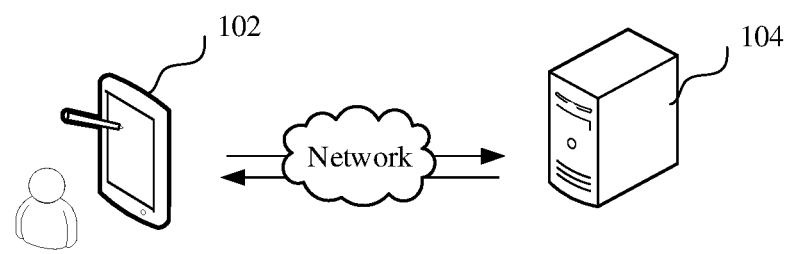
FIG. 1 is a diagram of an application environment of a replenishment method according to an embodiment.

A replenishment method provided in this application may be applied to an application environment shown in FIG. 1. A terminal 102 communicates with a server 104 through a network. For example, a replenishment order is stored in the server 104, and the terminal 102 obtains the replenishment order from the server 104. Alternatively, the replenishment order is stored in the terminal 102, and the server 104 obtains the replenishment order from the terminal 102. The terminal 102 may be, but is not limited to, a personal computer, a notebook computer, a smartphone, a tablet computer, and a portable wearable device. The server 104 may be implemented by an independent server or a server cluster including a plurality of servers.

Figure 2:
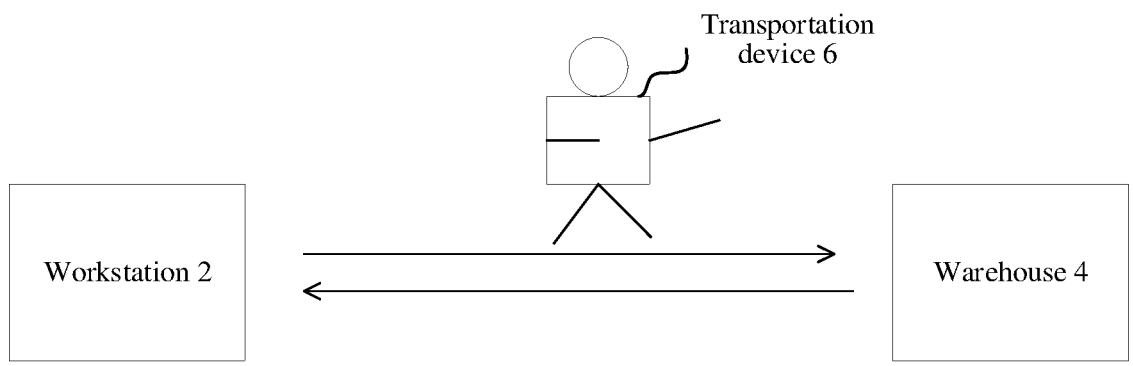
FIG. 2 is a schematic structural diagram of a replenishment system according to an embodiment.

The replenishment method provided in this application may be applied to a replenishment system 200 shown in FIG. 2. The replenishment system 200 includes a workstation 2, a warehouse 4, and a transportation device 6. The workstation 2 is used for sorting goods, the warehouse 4 is used for storing goods, and the transportation device 6 is used for transporting goods between the workstation 2 and the warehouse 4.

The transportation device 6 may be an item transporter, a mini-truck, a robot, and other devices that are movable and capable of storing items. The transportation device 6 may include a plurality of layers, and each layer may include at least two storage spaces. During the transportation of goods, the storage spaces of the transportation device 6 may be used for loading storage boxes, and the storage boxes are used for loading the goods. If the transportation device 6 is a robot, the transportation device 6 further includes a robotic arm that can extend and retract freely, to automatically take and place goods.

Figure 3:
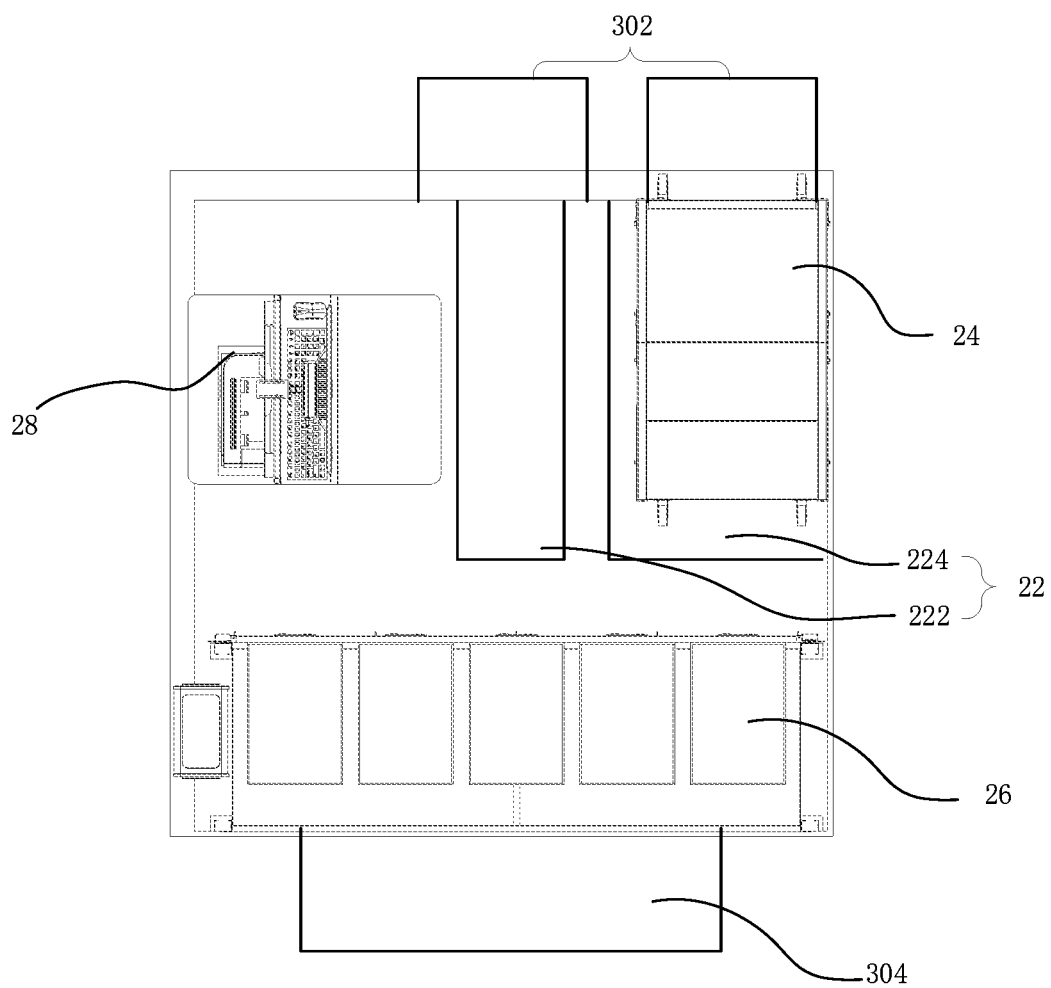
FIG. 3 is a schematic structural diagram of a workstation according to an embodiment.

As shown in FIG. 3, the workstation 2 includes: a picking working area 22, a work ladder 24, a put wall 26, a prompt device 28, a picking waiting area 302, and a put wall waiting area 304. The picking working area 22 provides a place for picking goods of the transportation device, and includes a first picking area 222 and a second picking area 224. The first picking area 222 and the second picking area 224 provide places for picking goods in a first storage space and a second storage space of the transportation device, respectively. The second storage space is higher than the first storage space. In an embodiment, a middle-layer storage space of the transportation device is used as a boundary. A storage space lower than the middle-layer storage space is used as the first storage space, and a storage space higher than the middle-layer storage space as well as the middle-layer storage space itself are used as the second storage space. The work ladder 24 is located in the second picking area 224, providing hardware support for picking goods in the second storage space of the transportation device. The put wall 26 is located on one side of the picking working area 22, and is used for storing the picked goods. The prompt device 28 is configured to output prompt information, and the prompt information includes but is not limited to storage position information of goods on the put wall 26. The picking waiting area 302 is used for the transportation device 6 to wait, and the picking waiting area 302 corresponds to the first picking area 222 and the second picking area 224. The put wall waiting area 304 corresponds to the put wall 26.

Figure 4:
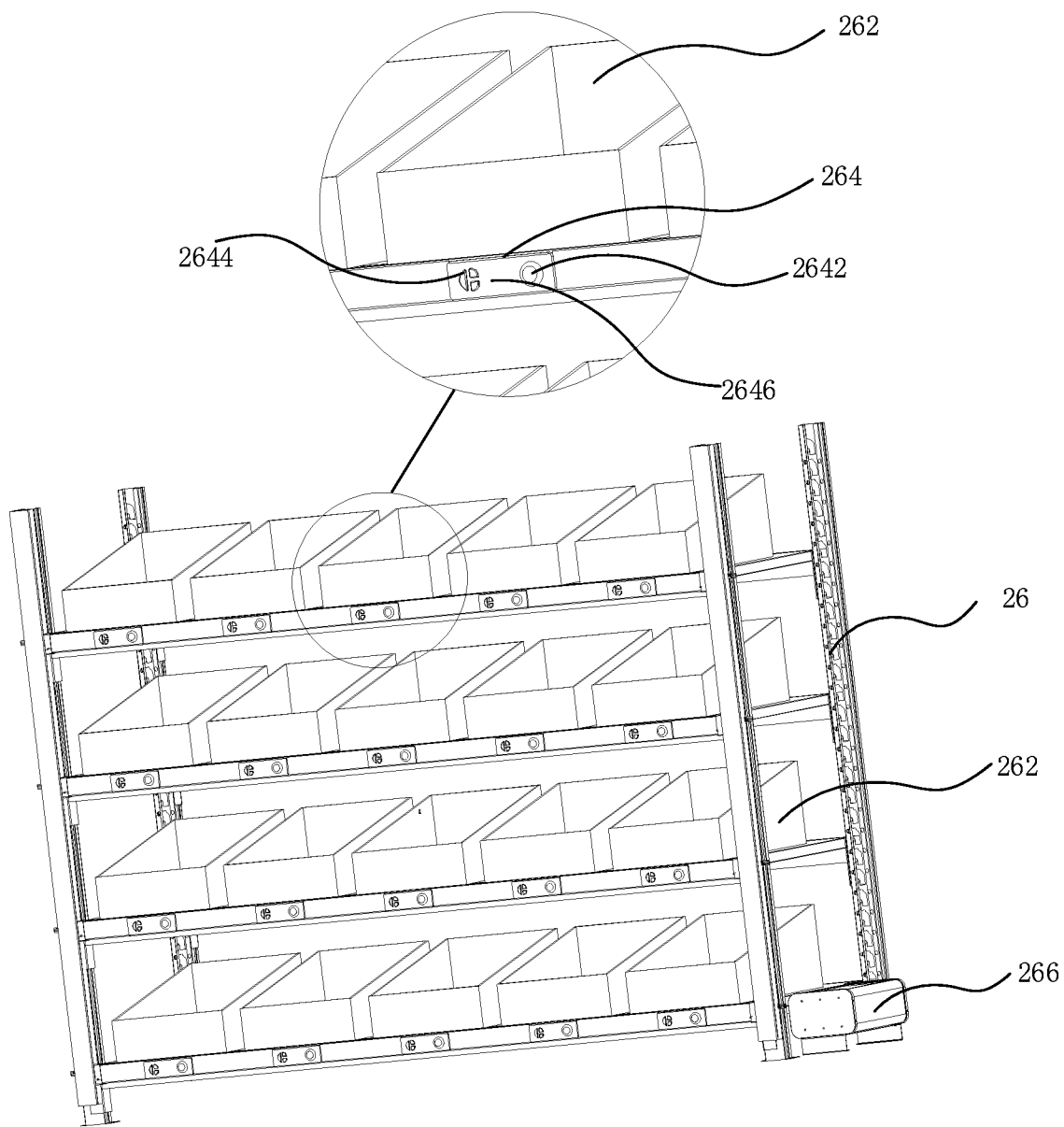
FIG. 4 is a schematic structural diagram of a put wall according to an embodiment.

As shown in FIG. 4, the put wall 26 may include at least two layers, and each layer may include at least two storage spaces 262. Each storage space 262 is provided with an electronic tag 264. The electronic tag 264 includes an indicator light 2642. The indicator light 2642 has at least two states, and the at least two states may be distinguished by at least one of the color, brightness, on/off, or blinking. The state of the indicator light 2642 may be used for indicating status of the storage space 262, such as goods placement and storage status.

In an embodiment, the electronic tag 264 is connected with a processor (not shown in the figure) and receives a control signal sent by the processor (not shown in the figure). In another embodiment, the put wall 26 further includes a controller 266. The controller 266 is connected with the processor (not shown in the figure) in a wired or wireless manner. The controller 266 is connected with the electronic tag 264. The controller 266 is configured to receive a control signal sent by the processor (not shown in the figure), and send the control signal sent by the processor (not shown in the figure) to the electronic tag 264.

In a specific embodiment, the prompt device 28 outputs prompt information, indicating the storage space of the transportation device 6 that requires picking, a corresponding picking quantity, and the storage space 262 for the picked goods on the put wall 26. An indicator light 2642 in the corresponding storage space 262 on the put wall 26 displays a first state, for example, an on state. When it is detected that goods are put into the corresponding storage space 262, the indicator light 2642 displays a second state, for example, an off state. When the storage space 262 is full or all goods corresponding to the storage space in an order have been put, the indicator light 2642 in the storage space 262 displays a third state, for example, a blinking state. In another embodiment, a control button (not shown in the figure) may be arranged at the position of the indicator light 2642. After putting goods into the storage space 262, an operator operates the control button to change the indicator light 2642 to the second state, for example, an off state. In another embodiment, the indicator light 2642 may have both the functions of the indicator light and the control button.

In an embodiment, as shown in FIG. 4, the electronic tag 264 further includes a counter 2644 and a display panel 2646. The counter 2644 is configured to count a quantity of goods in the storage space 262, and the display panel 2646 is configured to display the quantity of the goods in the storage space 262. In an embodiment, the counter 2644 is a scanning device. Before putting goods into a corresponding storage space 262, the operator scans the goods by using the counter 2644, and the display panel 2646 updates the quantity of the goods each time one good is put. In another embodiment, the counter 2644 includes a counter button 26442. The counter button 26442 may include a "plus" button, a "minus" button, and a "reset" button. For example, the operator clicks the "plus" button once when one good is put, thereby updating the quantity of the goods.

Figure 5:
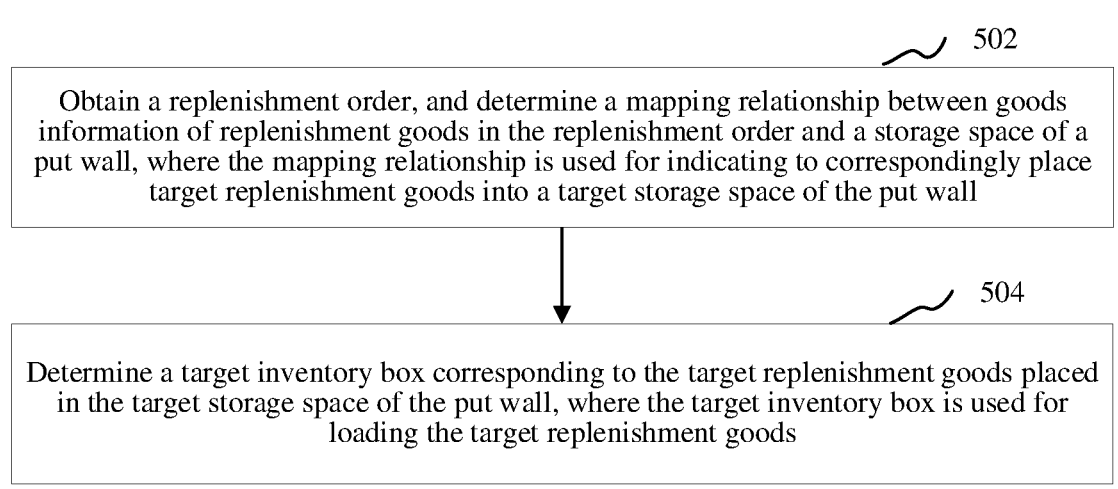
FIG. 5 is a schematic flowchart of a replenishment method according to an embodiment.
Figure 6:
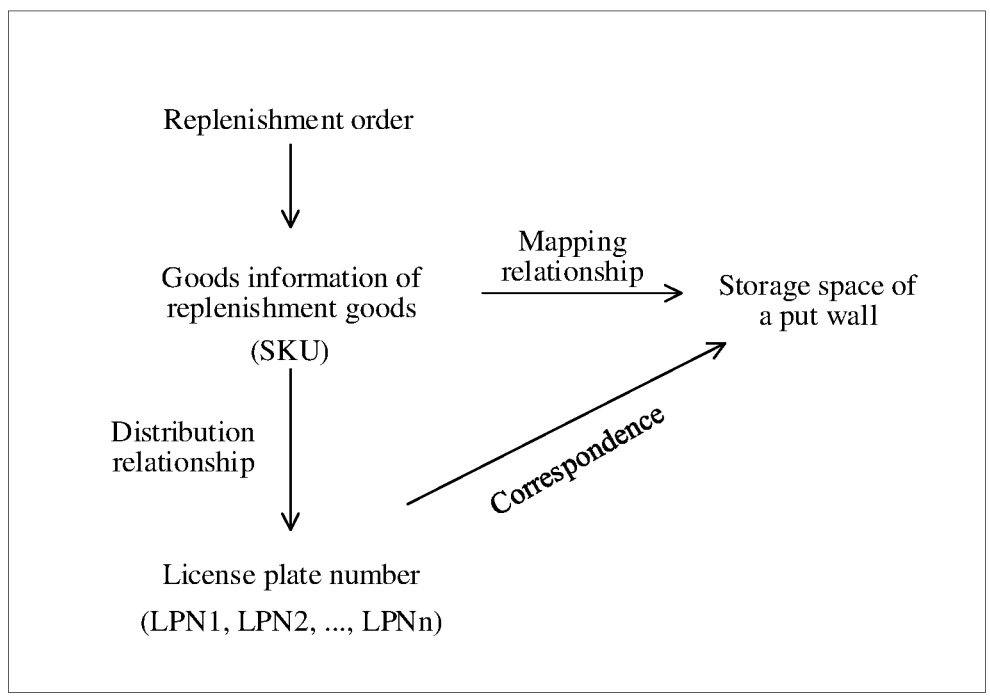
FIG. 6 is a schematic diagram of a relationship among goods information, a license plate number, and a storage space of a put wall according to an embodiment.

In an embodiment, as shown in FIG. 5, a replenishment method is provided. The method is applied to the terminal or the server in FIG. 1 and the replenishment system in FIGS. 2 to 4, and includes the following steps.

Step 502: Obtain a replenishment order, and determine a mapping relationship between goods information of replenishment goods in the replenishment order and a storage space of a put wall, where the mapping relationship is used for indicating to correspondingly place target replenishment goods into a target storage space of the put wall.

The replenishment goods are to-be-replenished goods in the replenishment order. The replenishment order is a list that records replenishment information corresponding to the replenishment goods. The replenishment information may include information such as goods information and the quantity of the replenishment goods.

The goods information may be a stock keeping unit, that is, SKU (Stock Keeping Unit), which is defined as a minimum usable unit for keeping inventory control. Sku information may include information such as the name, item number, color, size, and weight of goods. For example, clothes with the same item number in the same brand are considered as having one SKU. In the same brand, clothes with the same style, color, and size have the same item number.

The put wall is used for sorting and storing replenishment goods. The put wall includes at least two storage spaces, and each storage space is bound to one piece of goods information. That is, goods placed in one storage space of the put wall have the same goods information. It can be understood that the binding relationship may be removed and changed. The target storage space is a storage space of the target replenishment goods correspondingly placed on the put wall.

This embodiment may be implemented by a terminal or a server. The replenishment order may be stored in the terminal or the server. For example, the replenishment order is stored in the server. When the embodiment is executed by the terminal, the terminal obtains the replenishment order from the server. When the embodiment is executed by the server, the server gets the replenishment order from a storage medium.

Specifically, determining the mapping relationship between goods information of the replenishment goods in the replenishment order and a storage space of the put wall includes: receiving an input mapping relationship between goods information of the replenishment goods in the replenishment order and the storage space of the put wall. That is, the mapping relationship in the replenishment order may be set by the operator. The operator may enter the mapping relationship into the terminal or upload it to the server.

As shown in FIG. 5, because there are generally a large quantity of replenishment goods, the operator may further preset a distribution relationship between goods information of replenishment goods in a replenishment order and license plate numbers as well as a correspondence between the license plate numbers and storage spaces of the put wall. Further, the operator may enter the distribution relationship and the correspondence into the terminal or upload the distribution relationship and the correspondence to the server. The license plate number, that is, LPN (license plate number), is a code used for labeling goods. One license plate number corresponds to one piece of goods information. One piece of goods information corresponds to one or at least two license plate numbers. Each storage space of the put wall corresponds to one or at least two license plate numbers. It can be understood that, to facilitate storage, replenishment goods with one license plate number may be placed into the same storage bag. For example, one LPN code corresponds to 10 identical SKUs.

For example, when there are a large quantity of replenishment goods, all goods with the same goods information may not be able to be put into the put wall in one putting process. Therefore, with the preset distribution relationship between the goods information of the replenishment goods in the replenishment order and the license plate numbers as well as with the correspondence between the license plate numbers and the storage spaces of the put wall, all the goods with the same goods information can be put in the put wall after at least two putting processes. It should be noted that, the mapping relationship between the goods information and the storage space of the put wall can be removed only after all the replenishment goods with the same goods information in the replenishment order have been replenished.

In one embodiment, the storage space is provided with an electronic tag. The electronic tag includes an indicator light. The indicator light has at least two states, and the at least two states may be distinguished by at least one of the color, brightness, on/off, or blinking. For example, when the operator scans the target replenishment goods, the indicator light in the target storage space displays a first state, for example, an on state, to instruct to correspondingly place the target replenishment goods into the target storage space. It can be understood that, after the target replenishment goods are put into the target storage space, the indicator light displays a second state, for example, an off state. When all the target replenishment goods corresponding to the target storage space in the replenishment order have been put or the target storage space is full, the indicator light displays a third state, for example, a blinking state.

In one embodiment, a replenishment order is obtained, a mapping relationship between goods information of replenishment goods in the replenishment order and a storage space of a put wall is determined, and prompt information is outputted. The prompt information is information of the target storage space corresponding to the target replenishment goods. The prompt information may be in the form of voice or text. For example, when the operator scans the target replenishment goods, the prompt device on the workstation outputs voice prompt information, instructing to place the target replenishment goods into the target storage space.

In one embodiment, in combination with the prompt information and the indicator light, the operator or the robot is instructed to place the target replenishment goods into the target storage space. For example, the operator scans the target replenishment goods, and the prompt information is output. The prompt information is the information of the target storage space corresponding to the target replenishment goods. At the same time, the indicator light in the target storage space displays the first state, for example, an on state, instructing to place the target replenishment goods into the target storage space.

Step 504: Determine a target inventory box corresponding to the target replenishment goods placed in the target storage space of the put wall, where the target inventory box is used for loading the target replenishment goods.

Specifically, after the target inventory box corresponding to the target replenishment goods placed in the target storage space of the put wall is determined, the robot transports the target inventory box to the workstation. The terminal or the server stores a correspondence between the inventory box and a storage space of the robot. According to the correspondence between the inventory box and the storage space of the robot, the target replenishment goods in the target storage space are correspondingly placed into the target inventory box in the storage space of the robot. In an embodiment, the prompt information is used for instructing the operator or the robot to correspondingly place the target replenishment goods in the target storage space into the target inventory box in the storage space of the robot. For example, the operator scans the target replenishment goods, and the prompt information is output. The prompt information is information of the target inventory box in the storage space of the robot in which the target replenishment goods are to be placed.

When there are a large quantity of replenishment goods, at least two putting processes are required to put goods with the same goods information into the put wall. After all the target replenishment goods in the target storage space have been loaded into the target inventory box, it is determined whether all the replenishment goods with the goods information have been loaded into the target inventory box. If all the replenishment goods with the goods information are not loaded, it is continued to perform operations of placing the target replenishment goods into the target storage space and then loading the target replenishment goods in the target storage space into a target inventory box. If all the replenishment goods with the goods information have been loaded, the replenishment goods with the goods information are transported to the warehouse.

If all the replenishment goods with the goods information have been loaded, it is determined whether all replenishment goods in the replenishment order have been loaded into inventory boxes. If not, it is continued to perform operations of binding the goods information with a storage space of the put wall, placing the target replenishment goods into a target storage space, and then loading the target replenishment goods in the target storage space into a target inventory box until all the replenishment goods in the replenishment order have been loaded into inventory boxes, and a replenishment operation for the replenishment order is ended.

In the replenishment method, a replenishment order is obtained, and a mapping relationship between goods information of replenishment goods in the replenishment order and a storage space of a put wall is determined, where the mapping relationship is used for instructing to correspondingly place target replenishment goods into a target storage space of the put wall; and a target inventory box corresponding to the target replenishment goods placed in the target storage space is determined, where the target inventory box is used for loading the target replenishment goods. The sorting efficiency of replenishment goods is improved through the mapping relationship between the goods information and storage spaces of the put wall. The loading efficiency of replenishment goods is improved by intelligently allocating inventory boxes. In this way, the replenishment efficiency is improved, and labor costs are reduced.

In one embodiment, determining a target inventory box corresponding to the target replenishment goods placed in the target storage space of the put wall includes: receiving an entered box type, and determining the target inventory box according to the entered box type; or obtaining an inventory box type corresponding to goods information of the target storage space, and determining the target inventory box according to the inventory box type; or obtaining box types each with a full box record corresponding to goods information of the target storage space, and determining the target inventory box according to the box types with the full box records; or obtaining an inventory box with an empty compartment, and determining the target inventory box according to the inventory box with the empty compartment; or obtaining a default box type, and determining the target inventory box according to the default box type.

The box type is used for representing the capacity amount of a box. This embodiment may include at least two box types, a box corresponding to each box type includes one or at least two compartments, and each compartment may be used for holding replenishment goods.

The entered box type refers to a box type which is selected independently and entered by the operator. For the target replenishment goods, the operator enters a box type corresponding to the target replenishment goods. Then, a target inventory box of the box type entered by the operator is determined. The method for determining a target inventory box of the box type entered by the operator includes: selecting an inventory box with inventory of the entered box type, or selecting an empty box of the entered box type. In an embodiment, an inventory box with inventory of the entered box type is selected, and the goods stored in the inventory box has the same goods information as the target replenishment goods. If there is no such an inventory box in the warehouse, an inventory box with inventory corresponding to the entered box type is selected, and the goods stored in the inventory box has different goods information from that of the replenishment goods. If there is still no such an inventory box in the warehouse, an empty box of the entered box type is selected.

The inventory box type corresponding to the goods information refers to an inventory box in the warehouse that is not full of goods and the goods stored therein has the same goods information as the replenishment goods. In one embodiment, the method for determining the target inventory box according to the inventory box type may be: sorting inventory boxes of the inventory box type with inventory corresponding to goods information according to their empty compartments, and selecting an inventory box with the fewest empty compartments as the target inventory box; or sorting inventory boxes of the inventory box type with inventory corresponding to goods information according to their distances from an exit of the warehouse, and selecting an inventory box whose distance from the exit is the smallest as the target inventory box.

A box type with a full box record corresponding to the goods information refers to the following situation. When an inventory box is used for loading replenishment goods with the goods information, it has been recorded that the inventory box was full of goods at some time in the past. Then, the box type of such an inventory box is a box type with a full box record corresponding to the goods information. The full box record refers to the following situations. When target replenishment goods are loaded into a target inventory box, an operator determines that the target inventory box is full, and indicate this by giving a full box instruction. At this time, it is recorded that the target inventory box is full of goods. Alternatively, the operator may indicate this by giving a loading completion instruction. If the loading completion instruction about the target inventory box is received, it is determined whether there are remaining target replenishment goods in the target storage space. If yes, it is recorded that the target inventory box is full of goods. The loaded quantity of the target inventory box is a total loading quantity corresponding to the box type with the full box record.

The inventory box with an empty compartment refers to an inventory box in the warehouse that is not full of goods, wherein the goods information of the goods contained in the inventory box is not limited. In one embodiment, the numbers of remaining compartments in inventory boxes with an empty compartment are obtained. Inventory boxes with an empty compartment are sorted according to the numbers of remaining compartments, and the inventory box with the fewest empty compartments is selected. Alternatively, inventory boxes with an empty compartment are sorted according to their distances from an exit of the warehouse, and the inventory box whose distance is the smallest is selected.

The default box type is a preset box type, which may be set according to an actual application.

Specifically, priorities may be set for the methods for determining a box type described above. For example, the highest priority is set for an entered box type. If an entered box type is received, the target inventory box is determined according to the entered box type.

Figure 7:
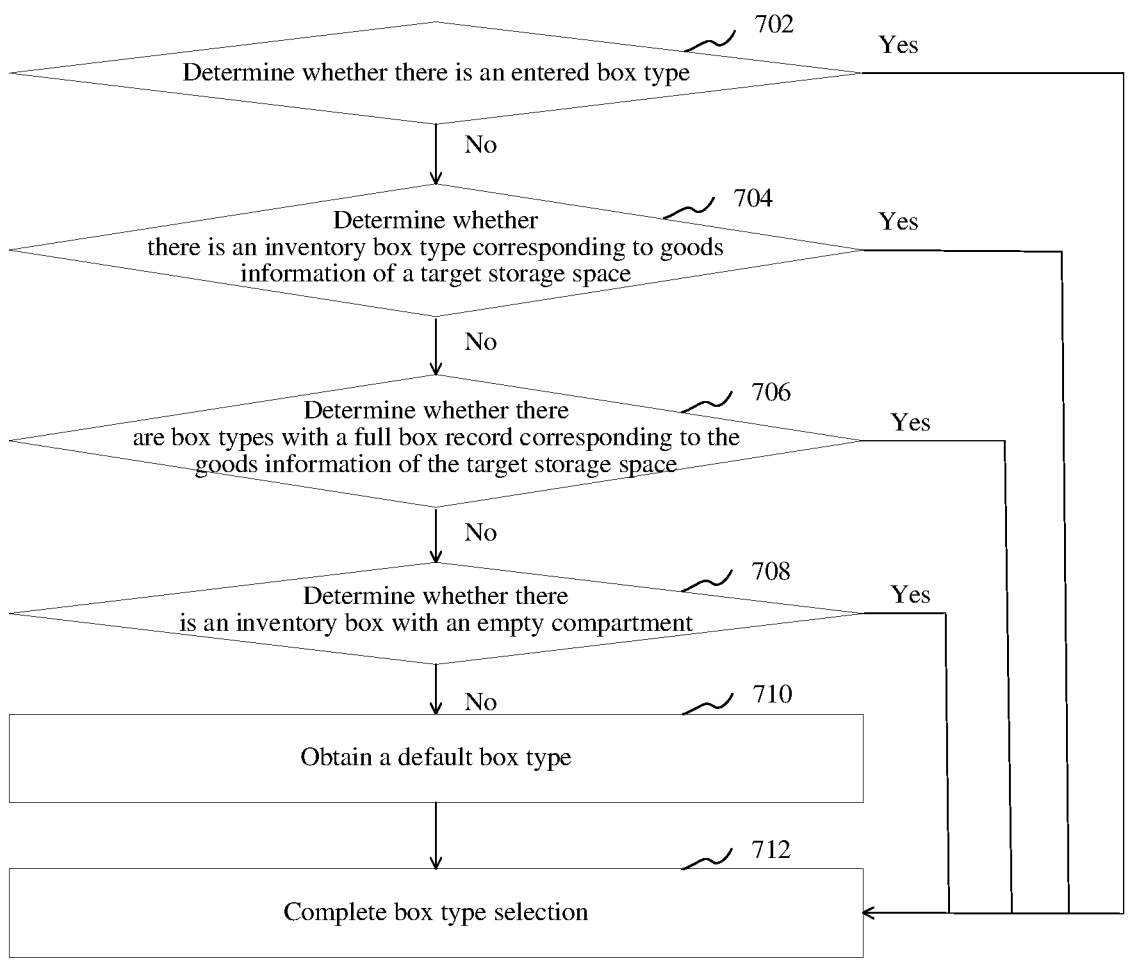
FIG. 7 is a schematic flowchart of a replenishment method according to another embodiment.

As shown in FIG. 7, in one embodiment, steps of box type selection are as follows.

Step 702: Determine whether there is an entered box type (If not, perform step 704, and if yes, perform step 712).

Step 704: Determine whether there is an inventory box type corresponding to goods information of a target storage space (If not, perform step 706, and if yes, perform step 712).

Step 706: Determine whether there are box types with full box records corresponding to the goods information of the target storage space (If not, perform step 708, and if yes, perform step 712).

Step 708: Determine whether there is an inventory box with an empty compartment (If not, perform step 710, and if yes, perform step 712).

Step 710: Obtain a default box type.

Step 712: Complete box type selection.

In the replenishment method described above, the inventory boxes are allocated intelligently, thereby improving the loading efficiency of replenishment goods.

In one embodiment, determining the target inventory box according to the box types with full box records includes: obtaining a box type with inventory among the box types with the full box records; and determining the target inventory box according to the box type with inventory among the box types with the full box records.

Specifically, the box type with inventory among the box types with the full box records is obtained, and the target inventory box is determined according to the box type with inventory among the box types with the full box records. The method for determining the target inventory box according to the box type with inventory among the box types with the full box records may be: sorting inventory boxes of the box type with inventory among the box types with the full box records according to the remaining compartments, and selecting the inventory boxes according to the numbers of the remaining compartments; or sorting the inventory boxes of the box type with inventory among the box types with the full box records according to distances from an exit of the warehouse, and selecting the inventory boxes according to the distances.

In the replenishment method described above, the inventory boxes are allocated according to the full box records, thereby improving the loading efficiency of replenishment goods.

In one embodiment, the method further includes: determining whether the box type with inventory among the box types with the full box records is capable of accommodating the target replenishment goods in the target storage space; and performing, if yes, the step of determining the target inventory box according to the box type with inventory among the box types with the full box records.

Specifically, it may be manually determined by the operator whether the box type with inventory among the box types with the full box records is capable of accommodating the target replenishment goods. If yes, the target replenishment goods in the target storage space are loaded into (a compartment of) the target inventory box. If not, a box needs to be changed based on the same box type, or the box type is changed.

Alternatively, it may be intelligently determined whether the target inventory box is capable of accommodating the target replenishment goods in the target storage space. Specifically, the total loading quantity corresponding to the box type with inventory among the box types with the full box records is obtained, the loaded quantity of the box type with inventory among the box types with the full box records is obtained, and it is determined, according to the total loading quantity and the loaded quantity, whether the box type with inventory among the box types with the full box records is capable of accommodating the target replenishment goods in the target storage space. When the quantity of the target replenishment goods is less than or equal to a difference between the total loading quantity and the loaded quantity, it is determined that the box type with inventory among the box types with the full box records is capable of accommodating the target replenishment goods in the target storage space.

In the replenishment method described above, if the box types with the full box records include a box type with inventory capable of accommodating the target replenishment goods, the target inventory box is determined according to the box type with inventory among the box types with the full box records, thereby implementing the reasonable loading of the replenishment goods into inventory boxes.

In one embodiment, determining whether the box type with inventory among the box types with the full box records is capable of accommodating the target replenishment goods in the target storage space includes: obtaining a total loading quantity corresponding to the box type with inventory among the box types with the full box records; obtaining a loaded quantity of the box type with inventory among the box types with the full box records; determining, according to the total loading quantity and the loaded quantity, whether the box type with inventory among the box types with the full box records is capable of accommodating the target replenishment goods in the target storage space; and determining, when the quantity of the target replenishment goods in the target storage space is less than or equal to the difference between the total loading quantity and the loaded quantity, that the box type with inventory among the box types with the full box records is capable of accommodating the target replenishment goods in the target storage space.

Specifically, according to the difference between the total loading quantity corresponding to the box type with inventory among the box types with the full box records and the loaded quantity of the box type with inventory among the box types with the full box records, a loadable quantity corresponding to the box type with inventory among the box types with the full box records is determined, and the quantity of the target replenishment goods in the target storage space is compared with the loadable quantity, thereby determining whether the box type with inventory among the box types with the full box records is capable of accommodating the target replenishment goods in the target storage space.

In the replenishment method described above, it is intelligently determined whether the inventory box is capable of accommodating the replenishment goods, thereby reducing labor costs.

In one embodiment, a method for generating the total loading quantity corresponding to a box type with a full box record includes: recording a loaded quantity of the target inventory box as the total loading quantity corresponding to the box type with the full box record if a loading completion instruction of the target inventory box is received and the target replenishment goods exist in the target storage space when loading the target replenishment goods in the target storage space into the target inventory box.

The loading completion instruction is used for indicating that a loading task for the target inventory box is completed. The loading completion instruction may be triggered by the operator. That is, when loading the target replenishment goods into the target inventory box, the operator determines that the target inventory box is full and triggers the loading completion instruction. The method for triggering the loading completion instruction may be: clicking a virtual button on the terminal.

Specifically, when loading the target replenishment goods in the target storage space into the target inventory box, and if a loading completion instruction of the target inventory box is received, it is determined whether there are remaining replenishment goods in the target storage space. If yes, the loaded quantity of the target inventory box is recorded as the total loading quantity corresponding to the box type with the full box record.

For example, for target replenishment goods with goods information, the quantity of the target replenishment goods in the target storage space is 100. When a loading completion instruction for the target inventory box is received, the quantity of the loaded target replenishment goods in the target inventory box is 60. There are only 60 target replenishment goods in the target inventory box. Then, the total loading quantity corresponding to a box type of the target inventory box is 60. For example, for target replenishment goods with goods information, the quantity of the target replenishment goods in the target storage space is 100. When a loading completion instruction for the target inventory box is received, the quantity of the loaded target replenishment goods in the target inventory box is 60. There are originally 20 replenishment goods with the goods information in the target inventory box. Then, the total loading quantity corresponding to the box type of the target inventory box is 80.

In the replenishment method described above, the total loading quantity of the box type with a full box record is determined intelligently.

In one embodiment, when loading target replenishment goods in a target storage space into the target inventory box, and if a full box instruction for the target inventory box is received, the loaded quantity of the target inventory box is recorded as the total loading quantity corresponding to the box type with a full box record.

The full box instruction is used for indicating that the target inventory box is full. The full box instruction may be triggered by the operator. That is, when loading the target replenishment goods into the target inventory box, the operator determines that the target inventory box is full and triggers the full box instruction. The method for triggering the full box instruction may be: clicking a virtual button on the terminal.

Specifically, when loading the target replenishment goods in the target storage space into the target inventory box, and if a full box instruction is received, the loaded quantity of the target inventory box is recorded as the total loading quantity corresponding to the box type with a full box record. For example, for target replenishment goods with goods information, when a full box instruction of the target inventory box is received, the total quantity of goods in the target inventory box is 60, and then the total loading quantity corresponding to a box type of the target inventory box is 60.

In the replenishment method described above, the total loading quantity of the box type with the full box record is determined by manual assistance.

In one embodiment, the method further includes: obtaining total loading quantities corresponding to a box type with a full box record with the same goods information for preset times; and determining the total loading quantity of the box type with the full box record according to the total loading quantities corresponding to the box type with the full box record with the same goods information for the preset times.

It can be understood that whether the target inventory box is full is based on the subjective judgment of the operator. For the upper limit of the capacity of the same box type, different operators may have different judgments. Therefore, the total loading quantities corresponding to the box type with a full box record with the same goods information for preset times may be combined to determine the total loading quantity corresponding to the box type with the full box record with the goods information. The preset times may be set according to an actual case.

In one embodiment, the preset times may be three times. That is, total loading quantities corresponding to a box type with a full box record with the same goods information in the last three times are selected, and an average value, a maximum value, or a minimum value of the total loading quantities in the last three times is used as the total loading quantity corresponding to the box type with the full box record with the goods information.

In the replenishment method described above, the accuracy of determining the total loading quantity of the box type with the full box record is improved.

In one embodiment, the method further includes: obtaining an empty box of a box type with a full box record, if there is no box type with inventory among the box types with the full box records, or if the box type with inventory among the box types with the full box records is incapable of accommodating the target replenishment goods in the target storage space; and determining the target inventory box according to the empty box of the box type with a full box record.

When the target inventory box is used for loading target replenishment goods with goods information, a full box record has been generated for the target inventory box, a box type corresponding to the target inventory box with the generated full box record is used as the box type with a full box record, and an empty box corresponding to the box type with the full box record is the empty box of the box type with the full box record.

If there is no box type with inventory among the box types with the full box records or the box type with inventory among the box types with the full box records is incapable of accommodating the target replenishment goods in the target storage space, an empty box of a box type with the full box record is obtained, and the target inventory box corresponding to the target replenishment goods in the target storage space is determined according to the empty box of the box type with the full box record.

In the replenishment method described above, the target inventory box is determined according to full box records corresponding to the goods information, thereby improving the loading efficiency of replenishment goods.

In one embodiment, the method further includes: determining whether the empty box of the box type with a full box record is capable of accommodating the target replenishment goods in the target storage space; and if yes, performing the step of determining the target inventory box according to the empty box of the box type with the full box record.

Specifically, it may be manually determined by the operator whether the empty box of the box type with a full box record is capable of accommodating the target replenishment goods in the target storage space. If yes, the target replenishment goods in the target storage space are loaded into (a compartment of) the corresponding target inventory box. If not, the box type needs to be changed.

Alternatively, it may be intelligently determined whether the empty box of the box type with a full box record is capable of accommodating the target replenishment goods in the target storage space. Specifically, a total loading quantity corresponding to an empty box of a box type with the full box record is obtained, and it is determined, according to the total loading quantity, whether the empty box of the box type with the full box record is capable of accommodating the target replenishment goods in the target storage space. When the quantity of the target replenishment goods in the target storage space is less than or equal to the total loading quantity, it is determined that the empty box of the box type with the full box record is capable of accommodating the target replenishment goods in the target storage space.

If the empty box of the box type with a full box record is incapable of accommodating the target replenishment goods in the target storage space, the target inventory box is determined according to the empty box of the box type with a full box record.

In the replenishment method described above, if the empty box of the box type with the full box record is capable of accommodating the target replenishment goods, the target inventory box of the target replenishment goods is determined according to the empty box of the box type with a full box record. In this way, the reasonable loading of the replenishment goods is implemented.

Figure 8:
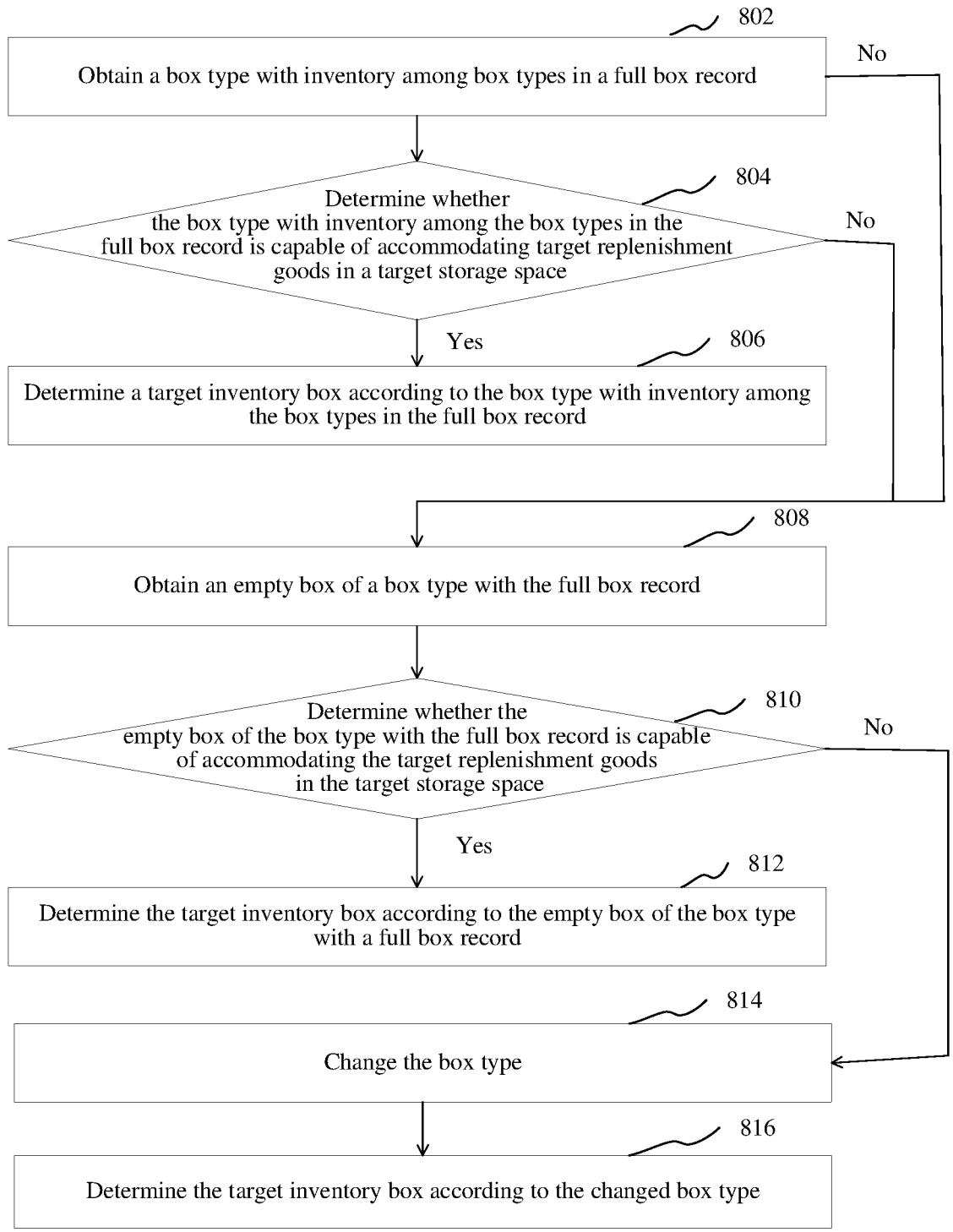
FIG. 8 is a schematic flowchart of a replenishment method according to still another embodiment.

In a specific embodiment, as shown in FIG. 8, the replenishment method includes the following steps.

Step 802: Obtain a box type with inventory among box types each with a full box record.

Step 804: Determine whether the box type with inventory among the box types with the full box records is capable of accommodating target replenishment goods in a target storage space.

Step 806: Determine, if yes, a target inventory box according to the box type with inventory among the box types with the full box records.

Step 808: Obtain an empty box of a box type with a full box record if there is no box type with inventory among the box types with the full box records or the box type with inventory among the box types with the full box records is incapable of accommodating the target replenishment goods in the target storage space.

Step 810: Determine whether the empty box of the box type with the full box record is capable of accommodating the target replenishment goods in the target storage space.

Step 812: Determine, if yes, the target inventory box according to the empty box of the box type with the full box record.

Step 814: Change, if not, the box type.

Step 816: Determine the target inventory box according to the changed box type.

In the replenishment method described above, the inventory boxes are allocated according to the full box records corresponding to the goods information, thereby improving the loading efficiency of replenishment goods.

In one embodiment, the method further includes: changing the box type if the empty box of the box type with the full box record is incapable of accommodating the target replenishment goods in the target storage space; and determining the target inventory box according to the changed box type.

Specifically, the changing order of box types may be preset, and the box type may be changed according to the preset changing order of the box types. For example, there are three box types, namely, T3, T2, and T1. The preset changing order of the box types is T3-T2-T1. If the current box type is T3, T3 is changed to T2.

In the replenishment method described above, if the empty box of the box type with a full box record is incapable of accommodating the target replenishment goods, the box type is changed. In this way, the reasonable loading of the replenishment goods is implemented.

In one embodiment, when it is detected that all the target replenishment goods with the goods information corresponding to the target storage space are not placed into the target storage space, a restocking instruction is sent. The restocking instruction is used for instructing to replenish the target replenishment goods with the goods information corresponding to the target storage space in the target storage space. Specifically, when there are a large quantity of replenishment goods, at least two putting processes are required to put goods with the same goods information into the wall. After all the target replenishment goods in the target storage space have been loaded into the target inventory box, it is determined whether all the replenishment goods with the goods information have been loaded into the inventory box. If all the replenishment goods with the goods information are not loaded, the restocking instruction is sent to place the remaining replenishment goods into the target storage space.

It is determined whether the target inventory box is full. If the box is not full, target replenishment goods in the target storage space continue to be loaded into the target inventory box. If the box is full, a target inventory box corresponding to the remaining replenishment goods is re-determined. If the replenishment goods with the goods information have been loaded, the replenishment goods with the goods information are transported to the warehouse.

In the replenishment method described above, it is avoided that inventory boxes need to be retrieved for multiple times, thereby improving the loading efficiency.

In one embodiment, after the step of determining the target inventory box, the method further includes: sending a replenishment end instruction when it is detected that all the replenishment goods in the replenishment order have been loaded into the corresponding inventory box, where the replenishment end instruction is used for instructing to end a replenishment operation for the replenishment order.

The replenishment end instruction may be a voice or text instruction. For example, a replenishment end instruction is output by a prompt device, to instruct to end the replenishment operation for the replenishment order.

When it is detected that all the replenishment goods in the replenishment order have been loaded into corresponding inventory boxes, a replenishment end instruction is sent to a robot, to instruct the robot to stop the replenishment operation for the replenishment order.

In the replenishment method described above, the replenishment end instruction is sent in time, so as to perform a replenishment operation for another replenishment order in time, thereby improving the replenishment efficiency.

In one embodiment, the method further includes: removing the mapping relationship between the goods information and the storage space of the put wall when the replenishment goods corresponding to the goods information in the replenishment order have been loaded.

Specifically, in a replenishment process for a replenishment order, a mapping relationship between goods information and a storage space of a put wall is kept. For example, in a case that there are a large quantity of replenishment goods, goods with the same goods information may not all be able to be put into the wall in one putting process. Therefore, with the mapping relationship, it can be ensured that all the goods with the same goods information are put into the wall after at least two putting processes. When the replenishment goods corresponding to the goods information in the replenishment order have been loaded, the mapping relationship between the goods information and the storage space of the put wall can be removed.

In the replenishment method described above, when the replenishment goods with the goods information corresponding to the storage space of the put wall have been loaded, the storage space of the put wall is vacated in time.

In one embodiment, the method further includes: sending a storage instruction when it is detected that a quantity of target inventory boxes loaded with the target replenishment goods reaches a preset threshold, where the storage instruction is used for instructing to put the target inventory boxes at corresponding positions of the warehouse.

The preset threshold may be set according to an actual application.

In one embodiment, when it is detected that the quantity of the target inventory boxes loaded with the target replenishment goods reaches the preset threshold, the storage instruction is sent to a robot, so that the robot deposits the target inventory boxes at corresponding positions of the warehouse.

In the replenishment method described above, it is indicated in time that the target inventory boxes are to be deposited, thereby improving the replenishment efficiency.

In one embodiment, after determining a target inventory box corresponding to the target replenishment goods placed in the target storage space of the put wall, the method further includes: changing the inventory box when the target inventory box is unloaded with goods, where the changed inventory box is used for loading target replenishment goods corresponding to the unloaded target inventory box.

Specifically, the operator or a robotic arm takes the target replenishment goods from a target storage space, and obtains (a compartment of) the target inventory box corresponding to the target replenishment goods; puts the target replenishment goods into the target inventory box, scans the target replenishment goods, and confirms that the target replenishment goods have been loaded. The method for confirming that the target replenishment goods have been loaded may be: clicking a loading completion button. The loading completion button may be a virtual button on the terminal.

If the target inventory box taken by the robot is incapable of loading the target replenishment goods, the operator does not scan the target replenishment goods, but can confirm that the target replenishment goods have been loaded. Because there is a correspondence between the target replenishment goods and the target inventory box, the method for detecting whether all the target replenishment goods in the storage space of the put wall have been loaded into the target inventory box may be: detecting whether (the compartment of) the target inventory box is loaded with the target replenishment goods, determining, if not, that the target inventory box is incapable of accommodating the target replenishment goods, and changing the box type. Alternatively, the method may be: detecting whether scanning information for the target replenishment goods corresponding to (the compartment of) the target inventory box has been received, determining, if not, that the target inventory box is incapable of accommodating the target replenishment goods, and changing the box type.

A changing order of box types may be preset, and the box type may be changed according to the preset changing order of the box types.

In the replenishment method described above, it is intelligently detected whether the target inventory box corresponding to the target replenishment goods is capable of accommodating the target replenishment goods. If not, the box type is changed to implement the intelligent selection of an inventory box, thereby reducing labor costs.

In one embodiment, the method further includes: sending a replenishment end instruction when an entered replenishment completion instruction for the replenishment order is detected.

The entered replenishment completion instruction for the replenishment order is a replenishment completion instruction entered by the operator. The replenishment end instruction is sent by the terminal or the server to instruct to end a replenishment procedure for the replenishment order.

Specifically, if an entered replenishment completion instruction for the replenishment order is detected, even if the replenishment order is not completed, the replenishment end instruction is still sent to instruct to end the replenishment procedure for the replenishment order. If the replenishment order is not completed, it is detected whether the replenishment goods that have not been put in storage have a determined inventory box. If yes, the determined inventory box is canceled.

In the replenishment method described above, when an entered replenishment completion instruction is detected, the replenishment procedure for the replenishment order is ended, thereby enhancing the selectability of the replenishment procedure.

In one embodiment, the method further includes: sending a box taking instruction after a target inventory box corresponding to the target replenishment goods placed in the target storage space is determined, where the box taking instruction is used for instructing to transport the target inventory box to a workstation.

The box taking instruction may be a voice or text instruction. For example, the box taking instruction is output through the prompt device, instructing to transport the determined inventory box to the workstation.

In one embodiment, when the target inventory box corresponding to the target replenishment goods placed in the target storage space is determined, a box taking instruction is sent to a robot, so that the robot transports the target inventory box to the workstation. The storage spaces of the robot may have a plurality of layers, and each layer may include at least two storage spaces. The correspondence between the target inventory box and the storage space of the robot is preset, so that the robot loads the target inventory box according to the correspondence between the target inventory box and the storage space.

In the replenishment method described above, the box taking is instructed in time, thereby improving the efficiency of the robot in transporting the inventory box.

Steps in flowcharts of FIGS. 5, 7, and 8 are showed in sequence based on indication of arrows, but it should be understood that the steps are not necessarily performed in sequence based on the sequence indicated by the arrows. Unless explicitly specified in this specification, execution of the steps is not strictly limited in the sequence, and the steps may be performed in other sequences. In addition, at least some steps in FIGS. 5, 7, and 8 may include multiple sub-steps or multiple stages, and these sub-steps or stages are not necessarily performed at a same time instant, and may be performed at different time instants. The sub-steps or stages are not necessarily performed in sequence, and the sub-steps or stages may be performed alternately with at least some of other steps, sub-steps or stages of other steps.

Figure 9:
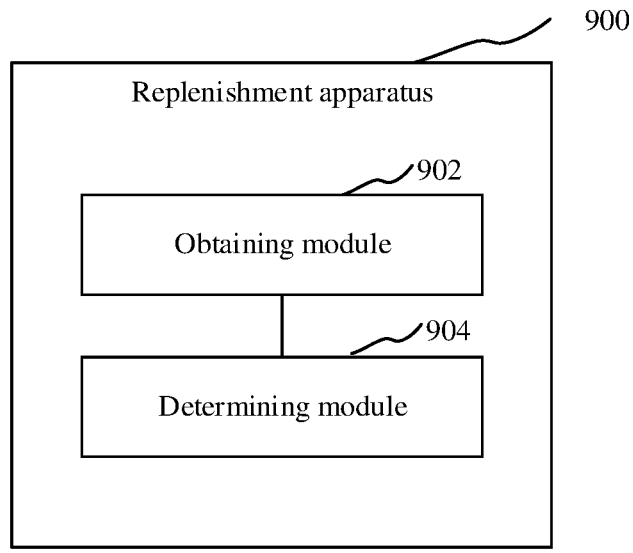
FIG. 9 is a structural block diagram of a replenishment apparatus according to an embodiment.

In one embodiment, as shown in FIG. 9, a replenishment apparatus 900 is provided, including an obtaining module 902 and a determining module 904.

The obtaining module 902 is configured to: obtain a replenishment order, and determine a mapping relationship between goods information of replenishment goods in the replenishment order and a storage space of a put wall, where the mapping relationship is used for instructing to correspondingly place target replenishment goods into a target storage space of the put wall.

The determining module 904 is configured to determine a target inventory box corresponding to the target replenishment goods placed in the target storage space of the put wall, where the target inventory box is used for loading the target replenishment goods.

According to the replenishment apparatus 900 provided in this application, a replenishment order is obtained, and a mapping relationship between goods information of replenishment goods in the replenishment order and a storage space of a put wall is determined, where the mapping relationship is used for instructing to correspondingly place target replenishment goods into a target storage space of the put wall; and a target inventory box corresponding to the target replenishment goods placed in the target storage space is determined, where the target inventory box is used for loading the target replenishment goods. The sorting efficiency of replenishment goods is improved with the mapping relationship between the goods information and the storage space of the put wall. The loading efficiency of replenishment goods is improved by intelligently allocating inventory boxes. In this way, the replenishment efficiency is improved, and labor costs are reduced.

In one embodiment, the determining module 904 is further configured to: receive an entered box type, and determine the target inventory box according to the entered box type; alternatively, obtain an inventory box type corresponding to goods information of the target storage space, and determine the target inventory box according to the inventory box type; alternatively, obtain box types each with a full box record corresponding to goods information of the target storage space, and determine the target inventory box according to the box types with the full box records; alternatively, obtain an inventory box with an empty compartment, and determine the target inventory box according to the inventory box with an empty compartment; or obtain a default box type, and determine the target inventory box according to the default box type.

In one embodiment, the determining module 904 is further configured to obtain a box type with inventory among the box types with full box records; and determine the target inventory box according to the box type with inventory among the box types with full box records.

In one embodiment, the determining module 904 is further configured to determine whether the box type with inventory among the box types with full box records is capable of accommodating the target replenishment goods in the target storage space; and perform, if yes, the step of determining the target inventory box according to the box type with inventory among the box types with full box records.

In one embodiment, the determining module 904 is further configured to: obtain a total loading quantity corresponding to the box type with inventory among the box types with the full box records; obtain a loaded quantity of the box type with inventory among the box types with the full box records; determine, according to the total loading quantity and the loaded quantity, whether the box type with inventory among the box types with the full box records is capable of accommodating the target replenishment goods in the target storage space; and determine, when a quantity of the target replenishment goods in the target storage space is less than or equal to the difference between the total loading quantity and the loaded quantity, that the box type with inventory among the box types with the full box records is capable of accommodating the target replenishment goods in the target storage space.

In one embodiment, the replenishment apparatus 900 further includes a recording module, and the recording module is configured to:

record a loaded quantity of the target inventory box as the total loading quantity corresponding to the box type with the full box record if a loading completion instruction of the target inventory box is received and the target replenishment goods exist in the target storage space when loading the target replenishment goods in the target storage space into the target inventory box; alternatively, record a loaded quantity of the target inventory box as the total loading quantity corresponding to the box type with the full box record if a full box instruction of the target inventory box is received when loading the target replenishment goods in the target storage space into the target inventory box.

In one embodiment, the determining module 904 is further configured to obtain total loading quantities corresponding to a box type with a full box record with the same goods information for preset times; and determine the total loading quantity of the box type with the full box record according to the total loading quantities corresponding to the box type with the full box record with the same goods information for the preset times.

In one embodiment, the determining module 904 is further configured to obtain an empty box of a box type with a full box record if there is no box type with inventory among the box types with full box records or the box type with inventory among the box types with the full box records is incapable of accommodating the target replenishment goods in the target storage space; and determine the target inventory box according to the empty box of the box type with the full box record.

In one embodiment, the determining module 904 is further configured to determine whether the empty box of the box type with the full box record is capable of accommodating the target replenishment goods in the target storage space; and perform, if yes, the step of determining the target inventory box according to the empty box of the box type with the full box record.

In one embodiment, the determining module 904 is further configured to change the box type if the empty box of the box type with the full box record is incapable of accommodating the target replenishment goods in the target storage space; and determine the target inventory box according to the changed box type.

In one embodiment, the determining module 904 is further configured to determine the target inventory box according to the empty box of the box type with the full box record if the empty box of the box type with the full box record is incapable of accommodating the target replenishment goods in the target storage space.

In one embodiment, the determining module 904 is further configured to send a restocking instruction when it is detected that all the target replenishment goods with the goods information corresponding to the target storage space are not placed into the target storage space, where the restocking instruction is used for instructing to replenish the target replenishment goods with the goods information corresponding to the target storage space in the target storage space.

In one embodiment, the replenishment apparatus 900 further includes an instruction module. The instruction module is configured to send a storage instruction when it is detected that a quantity of target inventory boxes loaded with the target replenishment goods reaches a preset threshold, where the storage instruction is used for instructing to put the target inventory boxes at corresponding positions of the warehouse.

In one embodiment, the replenishment apparatus 900 further includes a change module, and the change module is configured to change the inventory box when the target inventory box is unloaded, where the changed inventory box is used for loading target replenishment goods corresponding to the unloaded target inventory box.

In one embodiment, the instruction module is further configured to send a box taking instruction after the target inventory box corresponding to the target replenishment goods placed in the target storage space is determined, where the box taking instruction is used for instructing to transport the target inventory box to a workstation.

For specific descriptions of the replenishment apparatus 900, reference may be made to the descriptions of the replenishment method above. Details are not described herein again. The modules in the foregoing replenishment apparatus 900 may be implemented in whole or in part by software, hardware, or a combination thereof. The foregoing modules may be built in or be independent of a processor of a computer device in a hardware form, or may be stored in a memory of the computer device in a software form, so that the processor invokes and performs an operation corresponding to each of the foregoing modules.

Figure 10:
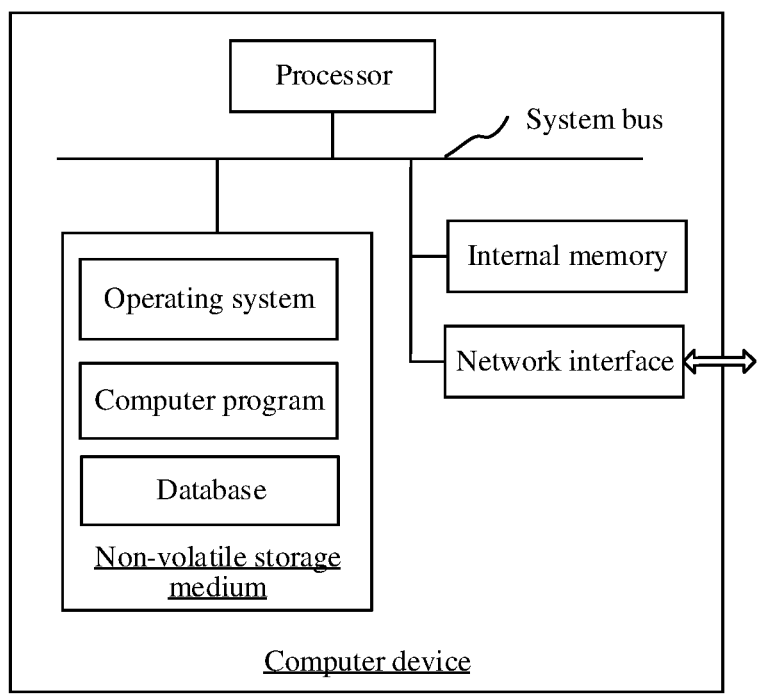
FIG. 10 is a diagram of an internal structure of a computer device according to an embodiment.

In one embodiment, a computer device is provided. The computer device may be a server or a terminal, and an internal structure diagram of the computer device may be shown in FIG. 10. The computer device includes a processor, a memory, a network interface, and a database connected by a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store replenishment data. The network interface of the computer device is configured to communicate with an external terminal through a network connection. The computer program is executed by the processor to implement a replenishment method. The steps of the replenishment method may be the steps of the replenishment method in the foregoing embodiments. A person skilled in the art may understand that, the structure shown in FIG. 10 is only a block diagram of a part of a structure related to a solution of this application and does not limit the computer device to which the solution of this application is applied. Specifically, the computer device may include more or fewer components than those in the drawings, or some components may be combined, or a different component deployment is used.

In one embodiment, a storage medium is provided, storing a computer program, the computer program, when being executed by a processor, causing the processor to perform the steps of the replenishment method described above. The steps of the replenishment method may be the steps of the replenishment method in the foregoing embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be arbitrarily combined. For concise descriptions, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, which are described specifically and in detail, but cannot be construed as a limitation to the patent scope of this application. For a person of ordinary skill in the art, several transformations and improvements may be made without departing from the idea of this application. These transformations and improvements belong to the protection scope of this application. Therefore, the protection scope of this application is subject to the protection scope of the appended claims.

What is claimed is:

1. A replenishment method, executable by a terminal or a server, and appliable to a replenishment system, the replenishment system comprising a workstation comprising a put wall, the put wall comprising at least two storage spaces, and each storage space being bound to one piece of goods information;
wherein the replenishment method comprises:
obtaining a replenishment order, and determining a mapping relationship between goods information of replenishment goods in the replenishment order and a storage space of the put wall, wherein the mapping relationship is used for instructing to correspondingly place target replenishment goods into a target storage space of the put wall;

instructing an operator or a robot to place the target replenishment goods into the target storage space of the put wall; and determining a target inventory box corresponding to the target replenishment goods placed in the target storage space of the put wall, wherein the target inventory box is used for loading the target replenishment goods;

wherein the determining the target inventory box corresponding to the target replenishment goods placed in the target storage space of the put wall comprises:

receiving an entered box type, and determining the target inventory box according to the entered box type; or obtaining an inventory box type corresponding to goods information of the target storage space, and determining the target inventory box according to the inventory box type; or obtaining at least one box type with a full box record corresponding to goods information of the target storage space, and determining the target inventory box according to the at least one box type with the full box record;

wherein the determining a mapping relationship between goods information of replenishment goods in the replenishment order and a storage space of the put wall comprises: receiving an input mapping relationship between the goods information of the replenishment goods in the replenishment order and the storage space of the put wall;

wherein the method further comprises: after the target inventory box corresponding to the target replenishment goods placed in the target storage space of the put wall is determined, sending a box taking instruction to a transporting robot to instruct the transporting robot to transport the target inventory box to the workstation that includes the put wall having the target storage space; and instructing the operator or the robot to correspondingly place the target replenishment goods in the target storage space into the target inventory box on the transporting robot.

2. The method according to claim 1, wherein determining the target inventory box according to the at least one box type with the full box record comprises:

obtaining a box type with inventory among the at least one box type with the full box record; and determining the target inventory box according to the box type with inventory among the at least one box type with the full box record.

3. The method according to claim 2, further comprising:

determining whether the box type with inventory among the at least one box type with the full box record is capable of accommodating the target replenishment goods in the target storage space; and performing, if yes, the step of determining the target inventory box according to the box type with inventory among the at least one box type with the full box record.

4. The method according to claim 3, wherein determining whether the box type with inventory among the at least one box type with the full box record is capable of accommodating the target replenishment goods in the target storage space comprises:

obtaining a total loading quantity corresponding to the box type with inventory among the at least one box type with the full box record;

obtaining a loaded quantity of the box type with inventory among the at least one box type with the full box record;

determining, according to the total loading quantity and the loaded quantity, whether the box type with inventory among the at least one box type with the full box record is capable of accommodating the target replenishment goods in the target storage space; and determining, when a quantity of the target replenishment goods in the target storage space is less than or equal to a difference between the total loading quantity and the loaded quantity, that the box type with inventory among the at least one box type with the full box record is capable of accommodating the target replenishment goods in the target storage space.

5. The method according to claim 4, wherein a method for generating the total loading quantity corresponding to the box type with the full box record comprises:

recording a loaded quantity of the target inventory box as the total loading quantity corresponding to the box type with the full box record, if a loading completion instruction of the target inventory box is received and the target replenishment goods exist in the target storage space when loading the target replenishment goods in the target storage space into the target inventory box; or recording a loaded quantity of the target inventory box as the total loading quantity corresponding to the box type with the full box record, if a full box instruction for the target inventory box is received when loading the target replenishment goods in the target storage space into the target inventory box.

6. The method according to claim 5, further comprising:

obtaining total loading quantities corresponding to a box type with the full box record with the same goods information for preset times; and determining the total loading quantity of the box type with the full box record according to the total loading quantities corresponding to the box type in the full box record with the same goods information for the preset times.

7. The method according to claim 3, further comprising:

obtaining an empty box of a box type with the full box record if there is no box type with inventory among the box type with the full box record or the box type with inventory among the box type with the full box record is incapable of accommodating the target replenishment goods in the target storage space; and determining the target inventory box according to the empty box of the box type with the full box record.

8. The method according to claim 7, further comprising:

determining whether the empty box of the box type with the full box record is capable of accommodating the target replenishment goods in the target storage space; and performing, if yes, the step of determining the target inventory box according to the empty box of the box type with the full box record.

9. The method according to claim 8, further comprising:

changing the box type if the empty box of the box type with the full box record is incapable of accommodating the target replenishment goods in the target storage space; and determining the target inventory box according to the changed box type.

10. The method according to claim 8, further comprising:
determining the target inventory box according to the empty box of the box type with the full box record if the empty box of the box type with the full box record is capable of accommodating the target replenishment goods in the target storage space.

11. The method according to claim 10, further comprising:
sending a restocking instruction when it is detected that all the target replenishment goods with the goods information corresponding to the target storage space are not placed into the target storage space, wherein the restocking instruction is used for instructing to replenish the target replenishment goods with the goods information corresponding to the target storage space in the target storage space.

12. The method according to claim 1, further comprising:
sending a storage instruction when it is detected that a quantity of target inventory boxes loaded with the target replenishment goods reaches a preset threshold, wherein the storage instruction is used for instructing to put the target inventory boxes at corresponding positions of a warehouse.

13. The method according to claim 1, wherein after determining a target inventory box corresponding to the target replenishment goods placed in the target storage space of the put wall, the method further comprises:
changing the inventory box when the target inventory box is unloaded, wherein the changed inventory box is used for loading target replenishment goods corresponding to the unloaded target inventory box.

14. A computer device, comprising a memory and a processor, the memory storing a computer program, wherein the processor, when executing the computer program, implements a replenishment method comprising:
obtaining a replenishment order, and determining a mapping relationship between goods information of replenishment goods in the replenishment order and a storage space of a put wall, wherein the mapping relationship is used for instructing to correspondingly place target replenishment goods into a target storage space of the put wall;
instructing an operator or a robot to place the target replenishment goods into the target storage space of the put wall; and
determining a target inventory box corresponding to the target replenishment goods placed in the target storage space of the put wall, wherein the target inventory box is used for loading the target replenishment goods;
wherein the determining the target inventory box corresponding to the target replenishment goods placed in the target storage space of the put wall comprises:
receiving an entered box type, and determining the target inventory box according to the entered box type; or
obtaining an inventory box type corresponding to goods information of the target storage space, and determining the target inventory box according to the inventory box type; or
obtaining at least one box type each with a full box record corresponding to goods information of the target storage space, and determining the target inventory box according to the at least one box type with the full box record;

wherein the determining a mapping relationship between goods information of replenishment goods in the replenishment order and a storage space of the put wall comprises: receiving an input mapping relationship between the goods information of the replenishment goods in the replenishment order and the storage space of the put wall;
wherein the method further comprises: after the target inventory box corresponding to the target replenishment goods placed in the target storage space of the put wall is determined, sending a box taking instruction to a transporting robot to instruct the transporting robot to transport the target inventory box to the workstation that includes the put wall having the target storage space; and
instructing the operator or the robot to correspondingly place the target replenishment goods in the target storage space into the target inventory box on the transporting robot.

15. A non-transitory computer-readable storage medium, storing a computer program, wherein when executed by a processor, the computer program causes the processor to implement a replenishment method comprising:
obtaining a replenishment order, and determining a mapping relationship between goods information of replenishment goods in the replenishment order and a storage space of a put wall, wherein the mapping relationship is used for instructing to correspondingly place target replenishment goods into a target storage space of the put wall;
instructing an operator or a robot to place the target replenishment goods into the target storage space of the put wall; and
determining a target inventory box corresponding to the target replenishment goods placed in the target storage space of the put wall, wherein the target inventory box is used for loading the target replenishment goods;
wherein the determining the target inventory box corresponding to the target replenishment goods placed in the target storage space of the put wall comprises: obtaining at least one box type with a full box record corresponding to goods information of the target storage space, and determining the target inventory box according to the at least one box type with the full box record;
wherein the determining the target inventory box according to the box type with the full box record comprises: obtaining a box type with inventory among the at least one box type with the full box record; and determining the target inventory box according to the box type with inventory among the at least one box type with the full box record;
wherein the at least one box type with the full box record corresponding to the goods information refers to: when an inventory box is used for loading replenishment goods with the goods information, the inventory box has been recorded that the inventory box was full of goods at some time in the past, and the box type of such an inventory box is the box type with the full box record corresponding to the goods information;
wherein the determining a mapping relationship between goods information of replenishment goods in the replenishment order and a storage space of the put wall comprises: receiving an input mapping relationship between the goods information of the replenishment goods in the replenishment order and the storage space of the put wall;

wherein the method further comprises: after the target inventory box corresponding to the target replenishment goods placed in the target storage space of the put wall is determined, sending a box taking instruction to a transporting robot to instruct the transporting robot to transport the target inventory box to the workstation that includes the put wall having the target storage space: and instructing the operator or the robot to correspondingly place the target replenishment goods in the target storage space into the target inventory box on the transporting robot.

* * * * *